(12) United States Patent
Durfee

(10) Patent No.: US 7,473,056 B2
(45) Date of Patent: Jan. 6, 2009

(54) SPADE BIT

(75) Inventor: Laverne Durfee, Harmony, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 210 days.

(21) Appl. No.: 11/163,489

(22) Filed: Oct. 20, 2005

(65) Prior Publication Data

US 2007/0092348 A1    Apr. 26, 2007

(51) Int. Cl.
B27G 15/00    (2006.01)

(52) U.S. Cl. .................... 408/225; 408/211; 408/227; 408/229

(58) Field of Classification Search ............... 408/223, 408/225, 227, 228, 229, 230, 211, 212, 213
See application file for complete search history.

(56) References Cited

U.S. PATENT DOCUMENTS

| | | |
|---|---|---|
| 0,124,089 A | 2/1872 | Shepardson |
| 0,131,946 A | 10/1872 | Ford |
| 0,146,344 A | 1/1874 | Ladd et al. |
| 0,356,138 A | 1/1887 | Knight |
| 0,764,664 A | 7/1904 | Jones |
| 0,877,592 A | 1/1908 | Parry et al. |
| 1,047,466 A | 12/1912 | Wagner |
| 1,056,670 A | 3/1913 | Hayden |
| 1,165,854 A | 12/1915 | Davis |
| 1,275,889 A | 8/1918 | Flander |
| 1,398,070 A | 11/1921 | Doyle |
| 1,398,780 A | 11/1921 | Hayden |
| 1,415,317 A | 5/1922 | Crawford et al. |
| 1,499,584 A | 7/1924 | Litchfield |
| 2,230,645 A | 2/1941 | Jones |
| 2,543,206 A | 2/1951 | Smith |
| 2,593,823 A | 4/1952 | WIlson |
| 2,613,710 A * | 10/1952 | Emmons .................... 408/213 |
| 2,618,304 A | 11/1952 | Wilson |

(Continued)

FOREIGN PATENT DOCUMENTS

EP    89123 A1 *    9/1983

(Continued)

OTHER PUBLICATIONS

Co-Pending, unpublished U.S Appl. No. 11/163,489, filed Oct. 20, 2005.

Primary Examiner—Monica S. Carter
Assistant Examiner—Michael W Talbot
(74) Attorney, Agent, or Firm—Dennis J. Williamson; Moore & Van Allen, PLLC

(57) ABSTRACT

The drill bit comprises a cutting blade formed at one end of a shank. The cutting blade has a pair of cutting shoulders that extend inwardly from the outer sides of the blade toward the bit axis. A tip having converging sides that create a point extends from the shoulders. The cutting edge of each shoulder is beveled with respect to the plane of the face of the blade. A flute is provided on the leading portion of each blade face adjacent the cutting edges. Each flute is a smooth curve that creates a substantially uninterrupted recess on each face of the blade that facilitates chip removal, increases the drill rate and lowers the power required to drill a hole. A non-stick coating may be applied to the blade to further facilitate chip removal.

11 Claims, 3 Drawing Sheets

U.S. PATENT DOCUMENTS

| | | | |
|---|---|---|---|
| 2,621,548 | A | 12/1952 | Williams |
| 2,627,292 | A | 2/1953 | Kronwall |
| 2,652,083 | A | 9/1953 | Emmons |
| 2,681,673 | A | 6/1954 | Mackey |
| 2,689,131 | A | 9/1954 | Priest |
| 2,692,627 | A | 10/1954 | Stearns |
| 2,752,965 | A | 7/1956 | Mackey |
| 2,782,824 | A | 2/1957 | Robinson |
| 2,794,468 | A | 6/1957 | Huxtable |
| 2,812,791 | A | 11/1957 | Mackey |
| 2,883,888 | A | 4/1959 | Stewart |
| 2,934,113 | A | 4/1960 | Hollien |
| 3,543,820 | A | 12/1970 | Tulumello |
| 3,564,947 | A * | 2/1971 | Maier ......................... 408/211 |
| 3,748,052 | A | 7/1973 | Jensen |
| 3,920,350 | A | 11/1975 | Southall |
| 3,966,350 | A | 6/1976 | Benjamin |
| 3,997,279 | A | 12/1976 | Porter |
| 4,012,970 | A | 3/1977 | Hintz et al. |
| 4,047,826 | A | 9/1977 | Bennett |
| 4,050,841 | A | 9/1977 | Hildebrandt |
| 4,060,335 | A | 11/1977 | Holloway et al. |
| 4,066,379 | A | 1/1978 | Prohaska |
| 4,078,621 | A | 3/1978 | Dewar et al. |
| 4,079,766 | A | 3/1978 | Conley et al. |
| 4,093,395 | A * | 6/1978 | Luebbert et al. ............ 408/224 |
| 4,160,616 | A | 7/1979 | Winblad |
| 4,286,904 | A | 9/1981 | Porter et al. |
| 4,289,432 | A * | 9/1981 | Elkins et al. ................ 408/201 |
| 4,524,449 | A | 6/1985 | Colling |
| 4,595,322 | A | 6/1986 | Clement |
| 4,682,917 | A | 7/1987 | Williams, III et al. |
| 4,725,171 | A * | 2/1988 | DeTorre ..................... 408/213 |
| 4,815,902 | A | 3/1989 | Durfee, Jr. |
| 4,826,364 | A | 5/1989 | Grunsky |
| 4,950,111 | A | 8/1990 | Thomas |
| 5,049,010 | A | 9/1991 | Oakes |
| 5,061,127 | A | 10/1991 | Thomas |
| 5,099,933 | A | 3/1992 | Schimke et al. |
| 5,145,018 | A | 9/1992 | Schimke et al. |
| 5,149,234 | A * | 9/1992 | Durfee, Jr. .................. 408/211 |
| 5,193,951 | A | 3/1993 | Schimke |
| 5,221,166 | A | 6/1993 | Bothum |
| 5,286,143 | A | 2/1994 | Schimke |
| 5,291,806 | A | 3/1994 | Bothum |
| 5,433,561 | A | 7/1995 | Schimke |
| 5,452,970 | A | 9/1995 | Sundstrom et al. |
| 5,458,211 | A | 10/1995 | Dennis et al. |
| D376,809 | S * | 12/1996 | Stone et al. ................. D15/139 |
| 5,599,144 | A * | 2/1997 | Bickham et al. ............ 408/144 |
| 5,649,796 | A | 7/1997 | Durney |
| 5,697,738 | A | 12/1997 | Stone et al. |
| 5,700,113 | A | 12/1997 | Stone et al. |
| 6,026,918 | A | 2/2000 | Briese |
| 6,224,302 | B1 | 5/2001 | Cole |
| 6,227,774 | B1 | 5/2001 | Haughton et al. |
| 6,253,812 | B1 | 7/2001 | Rinehart |
| 6,290,439 | B1 | 9/2001 | Bludis et al. |
| 6,354,773 | B1 | 3/2002 | Konen |
| 6,431,801 | B2 | 8/2002 | Vasudeva et al. |
| 6,499,919 | B2 | 12/2002 | Feld |
| 6,524,034 | B2 | 2/2003 | Eng et al. |
| 6,957,937 | B2 * | 10/2005 | Vasudeva ..................... 408/211 |
| 7,033,643 | B2 * | 4/2006 | Sugita et al. ................. 427/348 |
| 7,140,814 | B2 | 11/2006 | Singh et al. |
| 2002/0127071 | A1 | 9/2002 | Vasudeva |
| 2005/0249563 | A1 | 11/2005 | Scott et al. |
| 2006/0083595 | A1 * | 4/2006 | Wiker et al. ................. 408/225 |

FOREIGN PATENT DOCUMENTS

| | | |
|---|---|---|
| EP | 0127322 A1 | 12/1984 |
| EP | 0775560 A3 | 5/1997 |
| GB | 2083767 A | 8/1981 |
| SE | SU 518345 A * | 7/1976 |
| WO | 97/11346 A1 | 3/1997 |
| WO | 9805459 | 2/1998 |
| WO | 2004080632 A1 | 9/2004 |

* cited by examiner

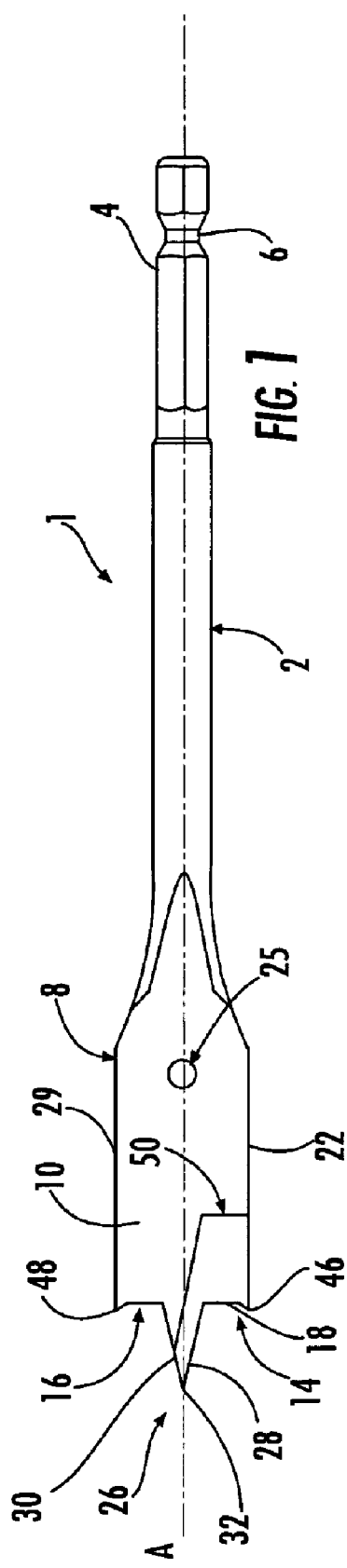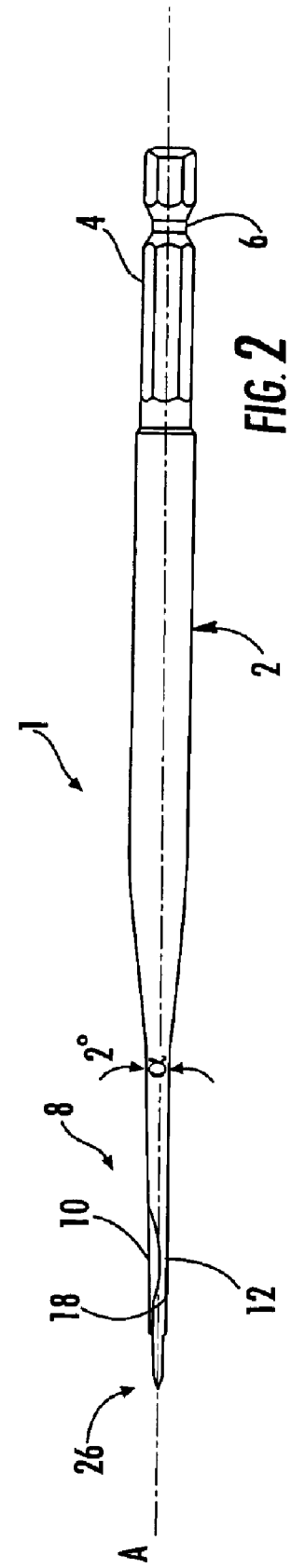

SPADE BIT

BACKGROUND

This invention relates generally to boring tools and more particularly to so-called "spade bits," which are typically used with a drill for drilling holes in wood.

Spade bits are widely used for boring holes between approximately ¼" and 1½" diameter in wood and similar soft materials, because they are fast, true cutting, resharpenable, and relatively inexpensive. Their name derives from the shape of the spadelike blade or cutter, in contrast to the spiral shape of augers and twist drills. The blade, which is usually forged integrally from the shank, is relatively thin and flat and may have a width several times the diameter of the shank.

One known spade bit is disclosed in U.S. Pat. No. 4,682, 917. A partial cross-section of this drill bit is shown drilling a bore in FIG. 8. This bit 11 includes a blade 3 shoulder flute 5 adjacent the cutting edge of each shoulder. The flute has a cross-sectional onfiguration having an inner surface portion 7 and an outer surface portion 9 where the outer portion and inner portion consist of planar surfaces that meet at an angle. The shoulder flutes preferably do not extend all the way to the outer sides of the blade but rather stop inwardly of the sides of the blade.

The inventor of the present drill bit determined that because the surface portions 7 and 9 comprise substantially planar surfaces that meet at a relatively sharp angle, the approximate path of travel of chips generated by this bit is as shown by the arrows in FIG. 8. Specifically the chips curl up face 9 until they strike face 7 at which point they are reflected at a relatively severe angle almost perpendicular to the direction of travel of the bit, represented by arrow C. The chips are trapped in the bore 13 where they are swirled around by the drill bit blade 3 as the drill bit rotates until the chips are eventually ejected from the bore.

It has been determined that moving the chips within the bore 13 by blade 3 slows the drilling rate and requires energy. Thus, not only is the drilling rate slower than optimal, the amount of energy used to drill the bore is increased. The use of excess energy to drill the bore can present a significant issue because many drills are battery powered such that the need for additional energy adversely affects the charge life of the battery resulting in the need for more frequent battery charges.

Thus, there is a need in the art for a bit that increases the drilling rate and that requires less power.

SUMMARY OF PREFERRED EMBODIMENTS OF THE INVENTION

The drill bit of the invention comprises a cutting blade formed at one end of a shank. The cutting blade has a pair of cutting shoulders that extend inwardly from the outer sides of the blade toward the bit axis. A tip having converging sides that meet at a point extends from the shoulders. The cutting edge of each shoulder is beveled with respect to the plane of the face of the blade. A flute is provided on the leading portion of each blade face adjacent the cutting edges. Each flute is a smooth curve that creates an uninterrupted recess on each face of the blade that facilitates chip removal, increases the drill rate and lowers the power required to drill a hole. A non-stick coating may be applied to the blade to further facilitate chip removal.

BRIEF DESCRIPTION OF THE DRAWINGS

FIG. 1 is a plan view of one embodiment of the drill bit of the invention.
FIG. 2 is a side view of the drill bit of FIG. 1.

DETAILED DESCRIPTION OF EMBODIMENTS OF THE INVENTION

Figure 3:
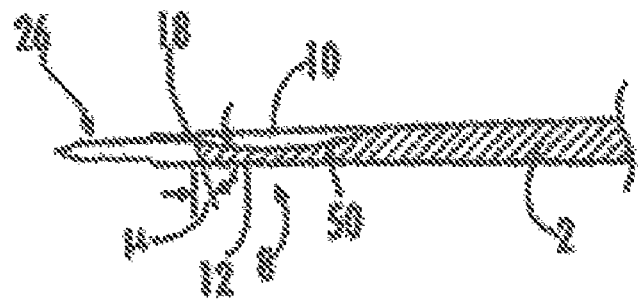
FIG. 3 is an enlarged side view of the drill bit of FIG. 2.

Referring more particularly to the drawings the drill bit of the invention is shown generally at 1 and consists of a shaft 2 having a hex connection 4 formed at one end thereof for engaging a chuck of a drill such as an electric or battery operated hand tool. The hex connection 4 may be formed with a recess 6 to be engaged by the quick-coupling of the drill chuck as is known in the art. The shaft 2 is connected to a cutting blade 8 having a first cutting face 10 and a second cutting face 12 where the blade is connected to the shaft with a taper angle α of approximately 2°. Specifically, each face of the blade 10, tapers from the axis of rotation of the blade A-A approximately 1° such that the angle between the faces is approximately 2°. The 2° taper provides a slightly thicker shaft thereby increasing the strength of the drill bit over conventional configurations. A hole 25 may be provided to hang the drill bit for storage. While the 2° taper is one preferred embodiment, the faces may be made parallel to one another such that the taper angle is 0°.

The blade 8 has a pair of shoulders 14 and 16 that form cutting edges 18 and 20, respectively. The outer side edges 22 and 24 of blade 8 are spaced from one another approximately the diameter of the desired hole. The side edges are formed with a taper such that the blade 8 is wider near the shoulders 14 and 16 than it is near the shaft 2 by approximately 0.01 inches to provide clearance to allow the blade to pass through the material being drilled. The outer side edges 22 and 24 are also formed with a side bevel β of approximately 7°-9° to allow the blade to clear the hole being drilled as the blade rotates as best shown in FIG. 4.

Figure 4:
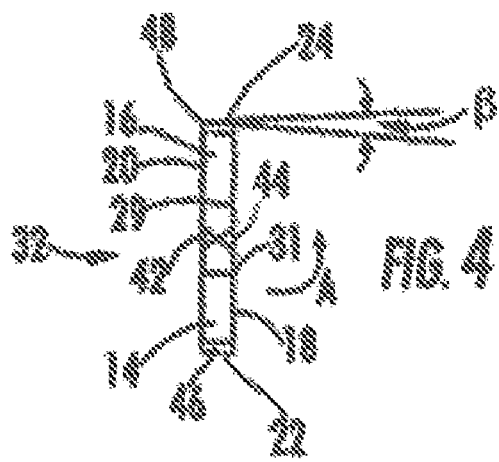
FIG. 4 is an end view of the bit of FIG. 1.
Figure 8:
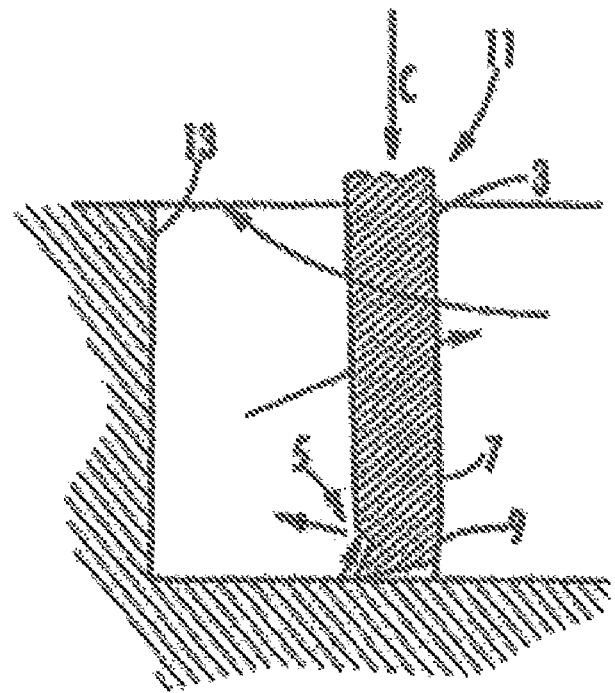
FIG. 8 is a partial section view of a prior art bit drilling a bore.

Referring to FIG. 4, the cutting edges 18 and 20 are on the leading edges of the blade 8 as the blade rotates in the direction of arrow A. The cutting edges 18 and 20 are formed, in part, by beveling the shoulders as best shown in FIG. 3 to create an acute angle μ between the shoulders and the plane of the face of the blade. In one embodiment bevel angle μis 12° to 22° with a preferred angle of 15° to 18°.

A tip 26, having converging sides 28 and 30, extends from between shoulders 14 and 16. The sides 28 and 30 of tip 26 meet at point 32. In one embodiment a pyramid-type point is created where surfaces 42 and 44 are formed in the tip such that the point is comprised of four surfaces meeting at a point. Tip 26 has cutting edges 29 and 31 formed at the leading edges thereof. Spurs 46 and 48 are formed at the ends of shoulders 14 and 16. Spurs 46 and 48 score and cut the periphery of the bore to create a clean cut line.

Adjacent to and forming part of each cutting edge 18 and 20 are flutes 50 and 52, respectively, that facilitate the removal of chips from the bore, increase the drilling rate and decrease the power required to drill the bore. The flutes 50 and 52 define a surface that has a smooth profile with no sharp corners or flat surfaces that impede chip flow out of the bore being drilled. In one embodiment the flutes extend approximately 0.45 inches from the cutting edge or at least one quarter of the length of the blade.

Figure 5:
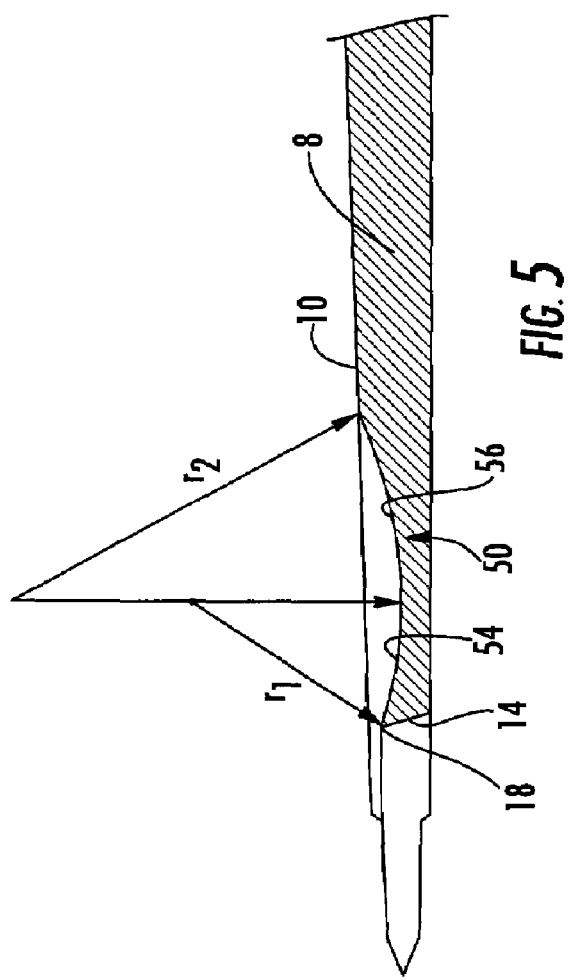
FIG. 5 is an enlarged partial section view of one embodiment of the drill bit of the invention.

Flutes 50 and 52 may be made identical such that specific reference is made to flute 50 in FIG. 5 where flute 50 is a curved surface formed of curves with two different radii. The first curved surface 54 is formed as a curved surface with a radius of curvature of $r_1$ and extends from the cutting edge 18 to a point where the radius is substantially perpendicular to the surface 10 of the blade 8. The first curved surface 54, where it intersects shoulder 14, defines cutting edge 18. The smaller the radius of curvature $r_1$ of this surface, the sharper the cutting edge 18. In one embodiment the radius $r_1$ is between 0.292 and 0.692 inches with a preferred radius of 0.492 inches. The second curved surface 56 is formed with a radius of curvature of $r_2$ and extends from the end of the first curved surface to surface 10 of blade 8. Radius $r_2$ is, in one embodiment, twice radius $r_1$ and is between 0.784 and 1.184 inches with a preferred radius of 0.984 inches. Curved surfaces 54 and 56 are arranged such that surface 54 is tangential to surface 56 such that the flute 50 is smooth with no pronounced surface interruptions.

The flutes 50 and 52 are arranged such that they extend laterally from approximately the axis A-A of the blade 8 to and through the outer surfaces 22 and 24, respectively. Because the flutes extend to the edges of the blade, manufacture of the blade is simplified. Specifically, a basic blade form can be made such as by a stamping process where the width of the blade form exceeds the width of a range of finished blades. The blade form can then be trimmed to the desired width. This is to be compared to the situation where the flute terminates internally of the edge of the blade such that each finished blade width must be based on a blade form that is specifically manufactured to that width.

In one embodiment the flutes 50 and 52 extend into the blade approximately half the thickness of the blade. While the flutes are shown as two curved surfaces having different radii of curvature, the flutes may be made of a curve having a constant radius of curvature. Moreover the flutes may be made of more than two surfaces having different radii of curvature. For example a third surface having a third smaller radius of curvature could be formed between surface 54 and cutting edge 18 to create a cutting edge having a sharper edge. In such an arrangement the third curved surface would be arranged tangential to surface 54. Likewise an additional curve having a larger radius of curvature may be used that is arranged tangential to surface 56.

Figure 6:
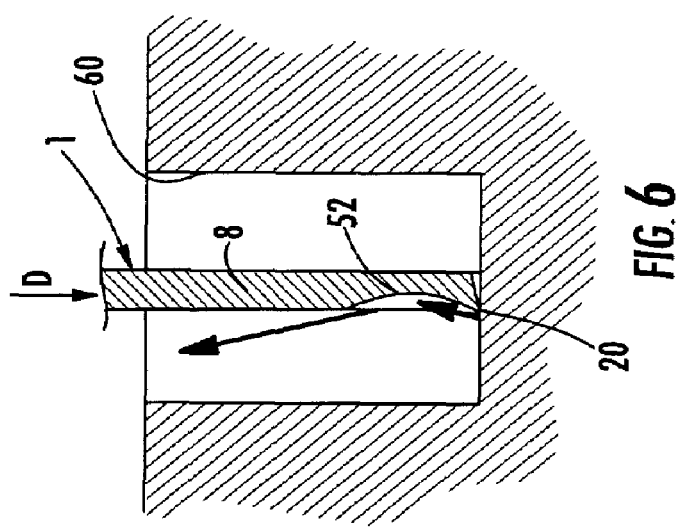
FIG. 6 is a partial section view showing the drill bit of the invention drilling a bore.

The operation of the drill bit of the invention will be described with reference to FIG. 6 where drill bit 1 is shown drilling bore 60. As cutting edges 18 and 20 engage the bottom of bore 60 chips are developed that flow in the direction of the arrows. Specifically the chips contact surface 52 and are projected substantially parallel to the direction of movement of drill bit 1 (represented by arrow D) and propelled out of bore 60. Because flutes 50 and 52 are substantially smooth and are not formed with angles or other surface protrusions, the chips can flow substantially parallel to the axis of the drill and are quickly ejected from the bore. Because the chips are quickly ejected from bore 60, they are not swirled in the bore by blade 8. As a result, more of the power used to rotate the blade is used for drilling, rather than being used to move the chips in the bore. Thus, the drill of the invention drills at a faster rate and uses less power. Because the blade uses less power, it can increase the charge life of a typical battery powered drill.

Figure 7:
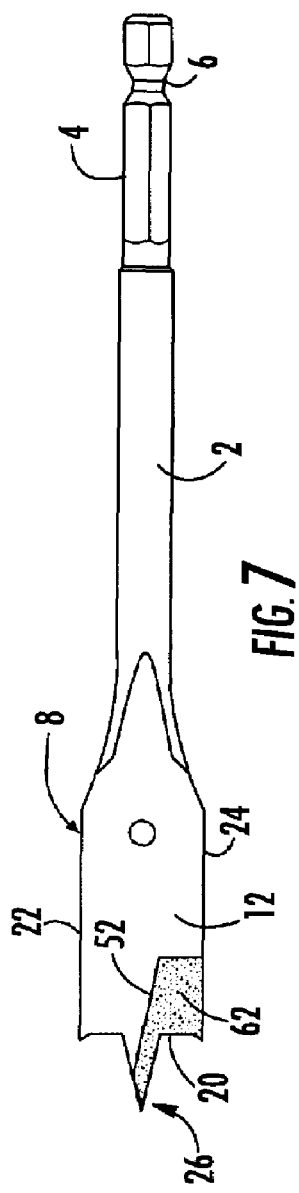
FIG. 7 is a plan view of another embodiment of the drill bit of the invention.

Another embodiment of the drill bit of the invention is shown in FIG. 7 and is similar to bit 1 of FIGS. 1 through 6, where like reference numerals are used to identify like components in the embodiment illustrated in FIG. 7. The blade is coated with a non-stick coating 62 to further enhance the ability of the blade to eject chips from the bore being drilled. In one embodiment the flutes 50 and 52 are covered with the non-stick coating. The coating may be a powdered coat paint that includes non-stick powder such as TEFLON®. The coating may be sprayed on or dipped. The coating may be a thermoplastic that is applied in powder form and then heated to melt onto the blade. Alternatively, the coating may be a thermal set powder that is applied in powder form and heated where the heat creates a chemical reaction that bonds the coating to the metal blade. While the non-stick coating is shown applied to the flutes, the coating may be applied to other portions of the blade including the entire blade 8.

Specific embodiments of an invention are disclosed herein. One of ordinary skill in the art will recognize that the invention has other applications in other environments. Many embodiments are possible.

What is claimed is:

1. A spade bit comprising:
   a shaft defining a longitudinal axis of the spade bit;
   a relatively thin, flat blade attached to the shaft, said blade having a relatively flat first face and a relatively flat second face opposite to said first face, said first face and said second face being joined by a first outer side edge and a second outer side edge;
   a tip formed along the longitudinal axis;
   a first cutting edge formed on the blade, said first cutting edge being straight and extending from the tip toward the first outer side edge and a second cutting edge formed on the blade, said second cutting edge being straight and extending from the tip toward the second outer side edge; and
   a first curved smooth flute formed in the first face adjacent to and extending along the first cutting edge and extending to a first end spaced axially from the first cutting edge and located in the first face and a second curved smooth flute formed in the second face adjacent to and extending along the second cutting edge and extending to a second end spaced axially from the second cutting edge and located in the second facet wherein the first flute and the second flute are each formed of a first curved surface and a second curved surface, the first curved surface extending from the first cutting edge to the first end and the second curved surface extending from the second cutting edge to the second end, and the first curved surface and the second curved surface having different radii of curvature where the first curved surface is tangential to said second curved surface.

2. The spade bit of claim 1 wherein the first flute forms part of the first cutting edge and the second flute forms part of the second cutting edge.

3. The spade bit of claim 1 wherein the first curved surface has a first radius of curvature and the second curved surface has a second radius of curvature, the second radius of curvature being approximately twice the first radius of curvature.

4. The spade bit of claim 1 wherein the first flute and the second flute are coated with a non-stick coating.

5. The spade bit of claim 1 wherein the tip is a pyramid shaped tip.

6. The spade bit of claim 1 wherein the blade includes spurs located at the first and second outer side edges.

7. The spade bit of claim 1 wherein the first curved surface has a radius of curvature between 0.292 and 0.692 inches.

8. The spade bit of claim 1 wherein the second curved surface has a radius of curvature of between 0.784 and 1.184 inches.

9. The spade bit of claim 1 wherein the centers of curvature of the first curved surface and the second curved surface are both located on a line substantially perpendicular to the blade.

10. The spade bit of claim 1 wherein the first flute extends to the first outer side edge and the second flute extends to the second outer side edge.

11. The spade bit of claim 1 wherein the blade has a width that is at least twice a diameter of the shaft.

* * * * *